United States Patent [19]

Correll

[11] Patent Number: 4,688,662
[45] Date of Patent: Aug. 25, 1987

[54] ENERGY ABSORBER

[75] Inventor: John D. Correll, North Ridgeville, Ohio

[73] Assignee: The Lamson & Sessions Co., Cleveland, Ohio

[21] Appl. No.: 734,494

[22] Filed: May 16, 1985

[51] Int. Cl.[4] .......................... F16F 9/30; F16F 7/12; F16F 1/14; B60R 21/00
[52] U.S. Cl. .................................. 188/268; 188/373; 267/154; 267/273; 297/216
[58] Field of Search ................. 188/268, 371, 373; 267/57, 57.1 R, 57.1 A, 63 R, 63 A, 140, 140.4, 153, 154, 157; 297/216, 471, 472; 248/548, 609; 384/221, 222

[56] References Cited

U.S. PATENT DOCUMENTS

| 1,754,258 | 4/1930 | Broadwell | 267/57.1 R |
|---|---|---|---|
| 3,019,622 | 2/1962 | Fermier | 267/154 X |
| 3,031,164 | 4/1962 | Schopf | 267/154 X |
| 3,089,564 | 5/1963 | Smittle | 188/371 |
| 3,118,660 | 1/1964 | Samiewski | 267/154 |
| 3,433,524 | 6/1969 | Close | 297/379 |
| 3,473,775 | 10/1969 | Rice | 248/548 |
| 3,514,155 | 5/1970 | Close | 297/379 |
| 3,568,806 | 3/1971 | Butt | 248/548 |
| 3,741,494 | 6/1973 | Fiala | 188/373 |
| 3,856,289 | 12/1974 | Steele | 267/154 |
| 3,873,076 | 3/1975 | Evans | 267/140 |
| 3,971,550 | 7/1976 | Matsuoka et al. | 267/57.1 R |
| 4,062,994 | 12/1977 | Millman et al. | 188/371 |
| 4,089,545 | 5/1978 | Ferry | 296/65 A |
| 4,231,555 | 11/1980 | Saito | 267/154 |
| 4,249,769 | 2/1981 | Barecki | 296/65 A |
| 4,286,777 | 9/1981 | Brown | 267/63 A |
| 4,480,736 | 11/1984 | Loizeau | 192/106.1 |
| 4,491,342 | 1/1985 | Aubry | 267/154 |

FOREIGN PATENT DOCUMENTS

| 0670770 | 1/1939 | Fed. Rep. of Germany | 248/609 |
|---|---|---|---|
| 2356586 | 5/1975 | Fed. Rep. of Germany | 267/57.1 A |
| 2726676 | 1/1979 | Fed. Rep. of Germany | 267/153 |

Primary Examiner—Andres Kashnikov
Assistant Examiner—Robert J. Oberleitner
Attorney, Agent, or Firm—Fay, Sharpe, Beall, Fagan, Minnich & McKee

[57] ABSTRACT

An energy absorber system utilizing a pair of housings having facing cavities and with a hollow deformable torsion member interconnecting the housings. One portion of the torsion member is received in the cavity of one housing and another portion of the torsion member is received in the cavity of the other housing. The housing cavities have cross-sectional conformations which receive the torsion member in such a manner that relative rotation therebetween is prevented. Rotation of one housing relative to the other deforms the torsion member elastically and/or plastically. Such deformation absorbs the energy of forces tending to rotate the housings.

24 Claims, 9 Drawing Figures

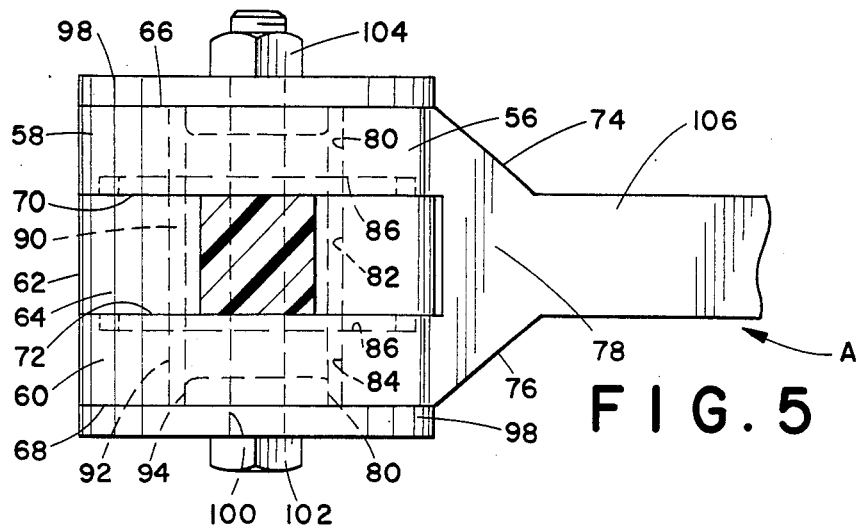
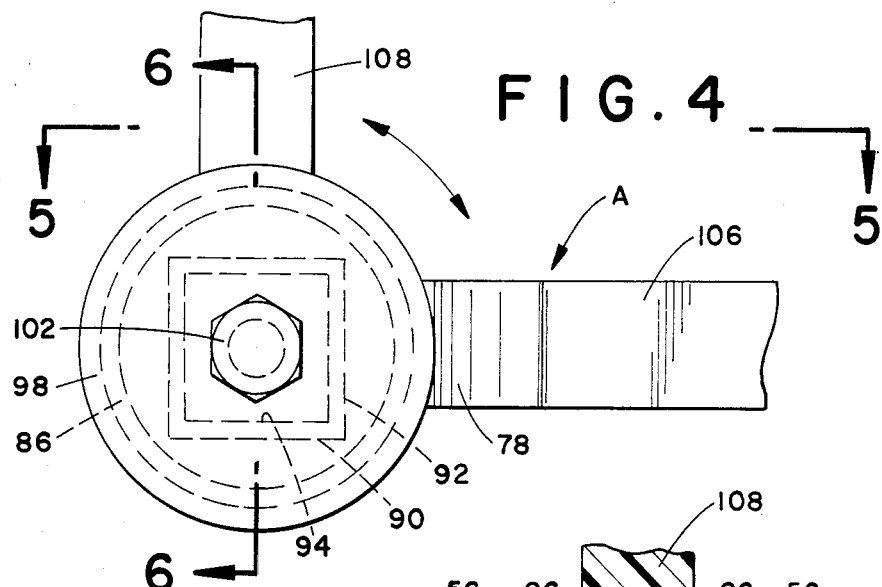
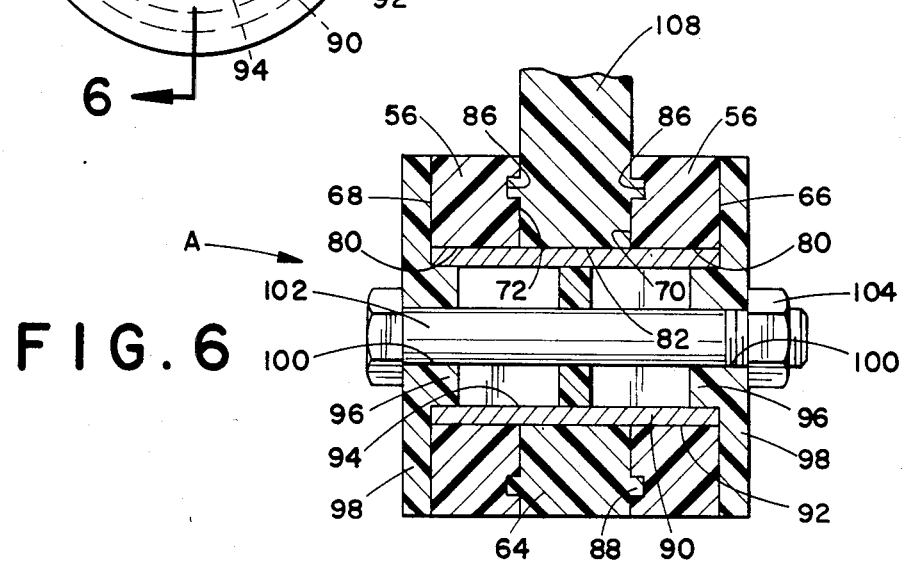

ENERGY ABSORBER

BACKGROUND OF THE INVENTION

This invention pertains to the art of energy absorbers and, more particularly, to energy absorbers using a deformable torsion member.

The invention is particularly applicable to a vehicle seat construction and will be described with particular reference to a plastic school bus seat. However, it will be appreciated that the invention has broader applications and may be adapted to use in other applications. Such applications may include, for example, an energy absorber for an automobile bumper, a torsional spring designed to decelerate rail cars, and the like.

In the past, school bus seats were conventionally constructed of bulky steel frames welded together at various strategic locations. With the steel frame designs, a great amount of padding is required on both the seat front and rear portions to meet modern crash standards. This results in a generally thick seat back member which, in turn, requires an excessive amount of interior bus space, particularly when considered in light of the total number of seats provided in a bus. The conventional padded steel frames also add a great deal of weight to the vehicles, thus reducing the efficiency and raising the cost of vehicle operation.

Federal Motor Vehicle Safety Standard No. 222 establishes specific capabilities which must be met by school bus passenger seating. For example, seat back deflection shall not exceed 14 inches, and the seats must be capable of absorbing over 16,000 in.-lbs. of energy in the forward direction. Furthermore, seat back deflection shall not exceed 10 inches in the rearward direction, and required head and knee form standards must also be met. Because of these stringent requirements, alternative school bus seats have not been widely developed beyond the above-noted conventional steel frame constructions.

It has been considered desirable, therefore, to develop an alternative seat arrangement which would meet federal safety standards and provide more efficient utilization of the available space in the interior of a bus. Such alternative seat arrangement should cost no more than the conventional seat constructions. The subject invention is believed to meet the foregoing needs and others, and provide an energy absorber which is simple to manufacture, effective in use, compact, and readily adapted to use in a wide variety of different applications.

BRIEF SUMMARY OF THE INVENTION

In accordance with the subject invention, a new energy absorber and absorbing system are advantageously provided. A pair of housings include facing cavities which receive a deformable torsion member. The torsion member is fixedly secured to each housing so that relative rotation between the housings requires torsion member deformation. That is, as the housings are rotated relative to each other, the torsion member deforms and absorbs in a controlled manner the energy of the force causing the rotation.

According to another aspect of the invention, the torsion member is hollow and has a multi-sided outer periphery. The housing cavities are configured to closely receive axial sections of the torsion member so that it is fixedly secured between the housings and relative rotation therebetween normally is prevented. The housings, in turn, are secured relative to each other to prevent axial displacement therebetween.

According to another aspect of the invention, the energy absorbing characteristics of the system may be varied by a number of means. For example, the material, shape and/or thickness of the torsion member may be varied. In like manner, either one or both of the housing cavities may be filled to some degree.

In accordance with still another aspect of the invention, each housing is secured to some member which may incur a sudden impact force. The design of the subject energy absorbing system is such that when the force reaches some predetermined magnitude, the housings are rotated relative to each other, thus deforming the torsion member. While being deformed, the torsion member absorbs the energy of the force in a controlled manner.

According to one preferred environment of use, the energy absorbing system is interposed between the seat bottoms and seat backs of school bus seats. The system allows the seats to absorb energies within applicable federal guidelines. In accordance with other preferred uses, the system is used as an energy absorber for vehicle bumpers, rail cars, and the like.

The principal advantage of the present invention is the provision of an energy absorbing system which is highly effective.

Another advantage of the invention resides in an energy absorbing system which is compact in design and simple to manufacture.

Still another advantage of the invention is found in an energy absorbing system which is adaptable to effective use in a wide variety of different environments.

Yet a further advantage of the invention is the provision of an energy absorbing system which is easily constructed so as to accommodate energy absorption from different degrees of forces or loading.

Still other advantages and benefits of the subject invention will become apparent to those skilled in the art upon a reading and understanding of the following detailed specification.

BRIEF DESCRIPTION OF THE DRAWINGS

The invention may take physical form in certain parts and arrangements of parts, preferred and alternative embodiments which will be described in detail in this specification and illustrated in the accompanying drawings which form a part thereof and wherein:

FIG. 4 is a plan view of an alternative energy absorber device incorporating the concepts of the invention;

FIG. 5 is a cross-sectional view taken along lines 5—5 of FIG. 4;

FIG. 6 is a cross-sectional view taken along lines 6—6 of FIG. 4 showing a partially filled housing cavity;

DESCRIPTION OF THE PREFERRED EMBODIMENT

Figure 1:
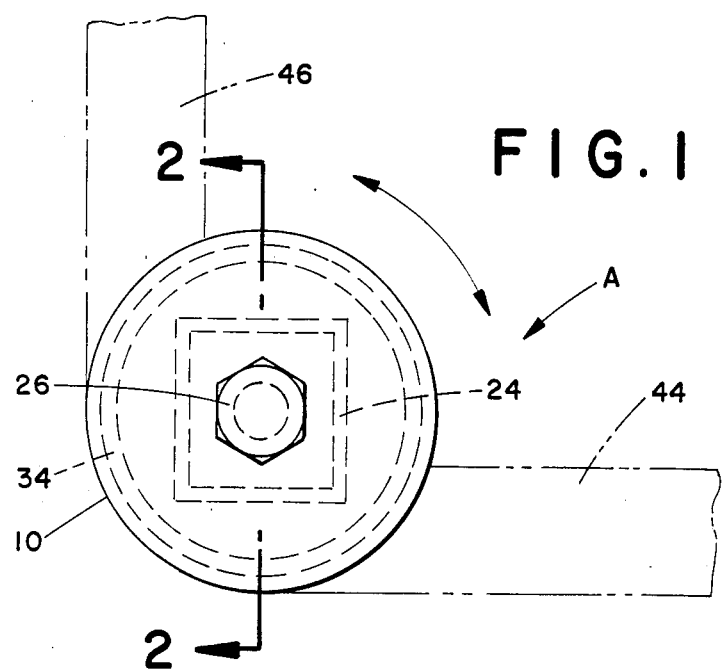
FIG. 1 is a plan view of an energy absorber device incorporating the concepts of the subject invention.
Figure 2:
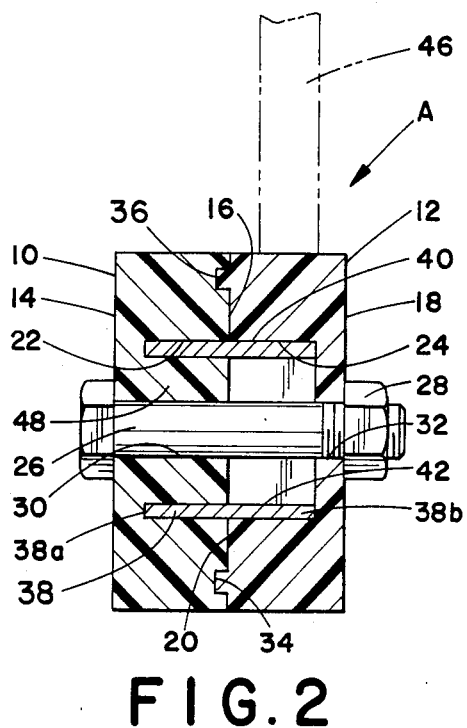
FIG. 2 is a cross-sectional view taken along lines 2—2 of FIG. 1, particularly illustrating a partially filled housing cavity.

Referring now to the drawings wherein the showings are for purposes of illustrating preferred and alternative embodiments of the invention only, and not for purposes of limiting same, FIGS. 1 and 2 illustrate one preferred form of the subject new energy absorber system A. As there shown, a first housing or shell 10 has a generally cylindrical conformation disposed in facing relation to a second housing or shell 12 of similar shape. It is to be appreciated that while cylindrical housings 10, 12 are shown, they could also take other forms without departing from the overall intent or scope of the invention. The first housing 10 has an exterior surface 14 and an interior surface 16. Likewise, the second housing 12 has an exterior surface 18 and an interior surface 20. The respective interior surfaces 16, 20 face one another in mating relation. A first cavity 22 is provided in first housing 10 to extend inwardly thereunto from interior surface 16. A second cavity 24 is similarly provided in second housing 12. The first and second cavities 22, 24 are axially aligned with one another for reasons which will become apparent. Retaining means are provided for fastening the first and second housings together. As shown in FIGS. 1 and 2, the retaining means comprises a bolt 26 and retaining nut 28. The bolt 26 extends through axially aligned bores 30, 32 of the first and second housings, respectively. The bores 30, 32 communicate with the cavities 22, 24 from the exterior surfaces 16, 18. It is to be understood that other convenient retaining means may be used as an alternative to the nut and bolt connection.

Rotational guide groove 34 is advantageously provided in the first housing interior surface 16 (FIG. 2) for receiving a rotational guide rim 36 which is integral with second housing interior surface 20. Rim 36 retains the housings in an aligned, rotative relationship during imposition of a torque to either one or both housings.

A deformable, hollow torsion member 38 is closely received at opposed ends 38a, 38b thereof in the first and second cavities 22, 24. As seen in FIG. 1, the outer periphery 40 of the torsion member closely matches and is received in the areas defined by the first and second cavities. The inner periphery of torsion member 42 may be of similar conformation to the outer periphery 40 for close engagement with a partial filling as will be explained hereinbelow.

As shown in phantom in both FIGS. 1 and 2, a pair of moment arms 44, 46 radiate outwardly from first and second housing shells 10, 12, respectively. Although illustrated in substantially perpendicular relation, the moment arms may be disposed in numerous angular positions. These moment arms may be made integral with the housing shells, or they may be attached thereto in any conventional manner.

In FIG. 2, first housing 10 is partially filled. That is, a partial filling 48 forms an interior core of first cavity 22. The first cavity 22 closely receives hollow torsion member 34 along its outer periphery 40, and the partial filling 48 is in close relationship with the inner periphery 42. Second cavity 24 is shown in FIG. 2 as being unfilled. One skilled in the art will appreciate that numerous combinations of partially filled first and second cavities 22, 24 may be employed to adjust the torque of the torsion member. That is, by shortening the effective length of the torsion member 38, the overall torque which may be applied to the housings prior to causing torsion member deformation may be varied.

Another manner of adjusting the torque resisting capabilities is through the use of alternative materials. The energy absorber in the subject application contemplates constructing the housings and filling material, as well as the moment arms, of a stampable, fiber reinforced plastic. One such suitable, commercially available material is marketed by PPG Industries, Inc. under the trademark AZDEL. Other plastics, reinforced plastics, or metals could also be used to obtain varied results. The torsion member itself is constructed of a material different than the housings and fillings material. In the preferred arrangement under discussion, an aluminum torsion member is employed, although other materials would also be entirely suitable.

Figure 3:
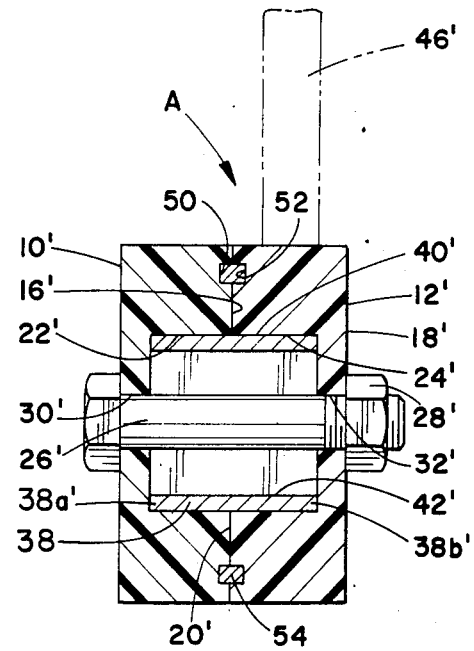
FIG. 3 is a cross-sectional view similar to FIG. 2 showing a slightly modified arrangement for the housings and housing cavities.

A slightly modified arrangement of the energy absorber A is shown in FIG. 3. For ease of appreciating this alternative, like components are identified by like numerals with a primed (') suffix, and new components are identified by new numerals. A first housing 10' is of generally cylindrical conformation and in abutting relation with a second housing 12'. Exterior surface 14' and interior surface 16' of the first housing are essentially mirror images of exterior surface 18' and interior surface 20' of the second housing. A first cavity 22' extends inwardly from interior surface 16', and a second cavity 24' extends inwardly from interior surface 20'. Bores 30', 32' are provided through central areas of the first and second cavities 22', 24', respectively, forming openings in the first and second exterior surfaces 14', 18'. A bolt 26' extends through the axially aligned bores and cavities for fastening engagement with retaining nut 28'. Tightening of the bolt 26' and nut 28' draws the interior surfaces 16', 20' of the first and second housings into abutting relation.

Matching guide grooves 50, 52 are provided in the interior surfaces 16', 20' of the first and second housings. The guide grooves 50, 52 cooperate to closely receive a separate guide rim 54. The guide rim 54 maintains the first and second housings in aligned relationship during relative rotation of the housings 10', 12' upon imposition of a torque to one of the housings.

A deformable torsion member 38' is closely received along the outer periphery 40' thereof and at opposite ends 38a', 38b' in the first and second cavities 22', 24'. It will be recognized that if retaining means other than the shown bolt and nut connection is utilized, a solid torsion member may alternatively be used in place of the illustrated hollow torsion member 38'. The remainder of this alternative construction and operation are substantially identical to that previously described with reference to the FIGS. 1 and 2 embodiment.

FIGS. 4, 5 and 6 show another alternative construction which incorporates the concepts of the invention. In this embodiment, the first housing takes the form of a yoke-shaped member 56. This yoke shape can be achieved by forming the first housing of two spaced portions 58, 60 to include an open end 62 adapted to receive the second housing 64. Alternatively, the first housing could be fabricated from a pair of identically shaped yoke members which are placed in mirrored, abutting relation, and then fixedly secured to each other in conventional fashion.

The first housing has a pair of exterior surfaces 66, 68 generally parallel to one another. Additionally, a pair of internal surfaces 70, 72 define the open end 62 of housing 56. A pair of angled surfaces 74, 76 extend from the exterior surfaces 66, 68 in merging relation to define a connecting portion 78. A first moment arm is integral with the connecting portion 78 to transmit a force exerted on the moment arm to the first housing.

Preferably, the open end 62 of first housing 56 has a pair of through cavities 80 extending generally normal to exterior and interior surfaces 66, 68 and 70, 72. The second housing 64 has a through cavity 82 aligned with through cavities 80 of first housing 56. These three aligned cavities function to define an elongated torsion member receiving area. Annular guide grooves 86 are included on each internal surface 70, 72, and annular guide rims 88 are included on the exterior of second housing 64 for close receipt in rotational guide grooves 86. The cooperative relationship between these grooves and rims aids in maintaining housings 54 and 64 in axially aligned relations in a manner similar to that previously described. As shown in FIG. 6, rims 88 are integral with the second housing, although it will be appreciated that other arrangements may suitably be employed.

A torsion member 90 is closely received within the receiving area defined by housing cavities 80, 82. The torsion member again has a polygonal cross-sectional conformation so as to closely mate with the side walls of the cavities and thereby prevent relative rotation between the torsion member and the housings. As shown in FIG. 6, torsion member 90 comprises an elongated hollow tubular member with axial portions thereof received in the housings. The inner periphery 94 of the tubular member closely receives filling areas 96 which extend inwardly thereinto from a pair of opposed end caps 98. Filling areas 96 conform to the interior of torsion member 90 to shorten the effective length thereof (FIG. 6) for reasons previously described. The end caps generally conform to exterior surfaces 66, 68 of first housing spaced portions 58, 60, and are fixedly secured to the first housing by convenient means such as set screws or the like (not shown). Bores 100 extend through the end caps and are adapted to receive fastening means. A bolt 102 and retaining nut 104 comprise one such means, and are employed to retain first and second housings 56, 64 in operative communication with each other. It is contemplated, however, that alternative means may be used for this purpose.

A first moment arm 106 is shown as extending radially from connecting portion 78 (FIGS. 4 and 5). A second moment arm 108 extends radially from second housing 64 in angularly spaced relation to first arm 106. As shown in the FIGURES, arms 106, 108 are integral with their respective housings 56, 60, although, again, other arrangements may also be satisfactorily employed.

In FIG. 6, filling areas 96 extend a predetermined distance into the interior of the torsion member. A central core member 110 is also shown as being closely received within the tubular torsion member at an area thereof generally midway between the opposed ends, ie., within the second housing cavity 82. Therefore, the effective length of the torsion member 90 is defined by the distance between the central core 110 and one of filling areas 96. As will be evident to one of ordinary skill in the art, adjustment of the torque resisting capabilities of the torsion member may be controlled by varying the amount of filling within the inner periphery 94.

Figure 7:
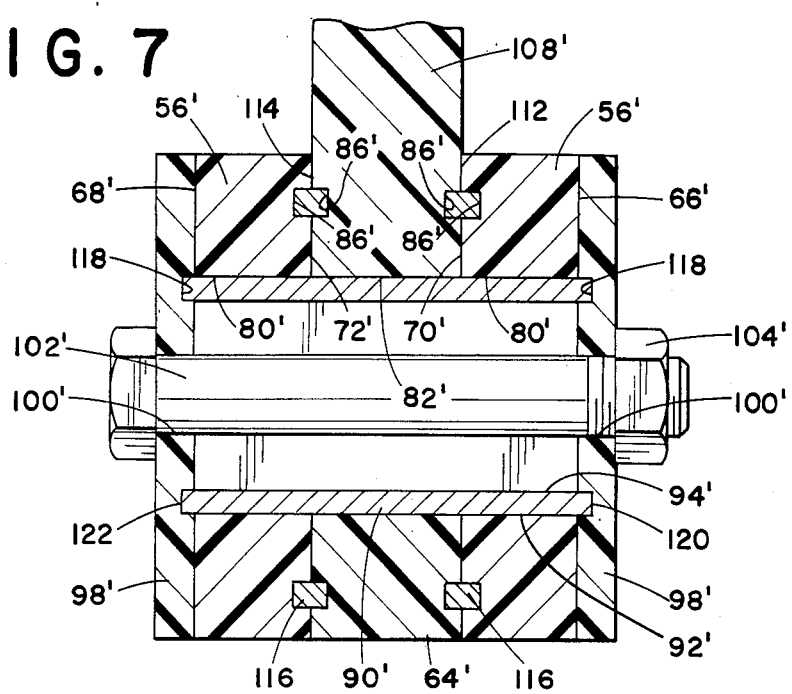
FIG. 7 is a view similar to FIG. 6 showing a slightly modified construction for the housings.

FIG. 7 shows a slightl modified construction of the yoke-shaped embodiment of FIGS. 4–6. Like numerals with a primed (') suffix are used to identify like components while new numerals are used to identify new components. The first housings 56' has a pair of spaced portions 58', 60' defining an open end 62' which is adapted to receive second housing 64'. The exterior surfaces 66', 68' of the spaced portions 58', 60' are generally parallel to interior surfaces 70', 72'. The interior surfaces 70', 72', as well as the external surfaces 112, 114 of the second housing 64', are provided with annular guide grooves 86'. Separate guide rims 116 are received in close relation with the guide grooves 86' for maintaining the housings in an axially aligned, rotative relationship.

A torsion member 90' is closely received along the outer periphery 92' thereof in cavities 80', 82' which define a torsion member receiving area. An annular groove 118 is formed in each of end caps 98' for receiving the opposed ends 120, 122 of the torsion member. A bolt 102' passing through aligned bores 100' in the end caps cooperates with a nut 104' to form retaining means which, when tightened, maintains the housings 56', 64' in firm abutting relation.

In operation, the energy absorbers of FIGS. 1–7 absorb energy generated by the application of a torque directly to a housing or by a force applied to a moment arm attached to the housings. The housings transfer the load, in the form of a rotating torque, to the torsion member. The housings are retained in abutting relation due to the retaining means, and the housings rotate with respect to one another along arcuate paths defined by the guide grooves and guide rings. The cross-sectional conformation of the torsion member prevents the torsion member from rotating relative to its surrounding housing. In addition, the torsion member prevents the housings from initially rotating relative to one another. Further force exertion surpasses a predetermined torque magnitude which the torsion member can withstand and elastic and/or plastic deformation occurs.

The torsion member deforms in a controlled manner such that energy is absorbed and the relative rotation between the housings (and the axial portions of the torsion member) is dissipated. As described previously, the torque resisting capabilities of the energy absorber may be adjusted through variation of materials, partially filling the torsion member, or varying the size and conformation of the torsion member and housings.

Figure 8:
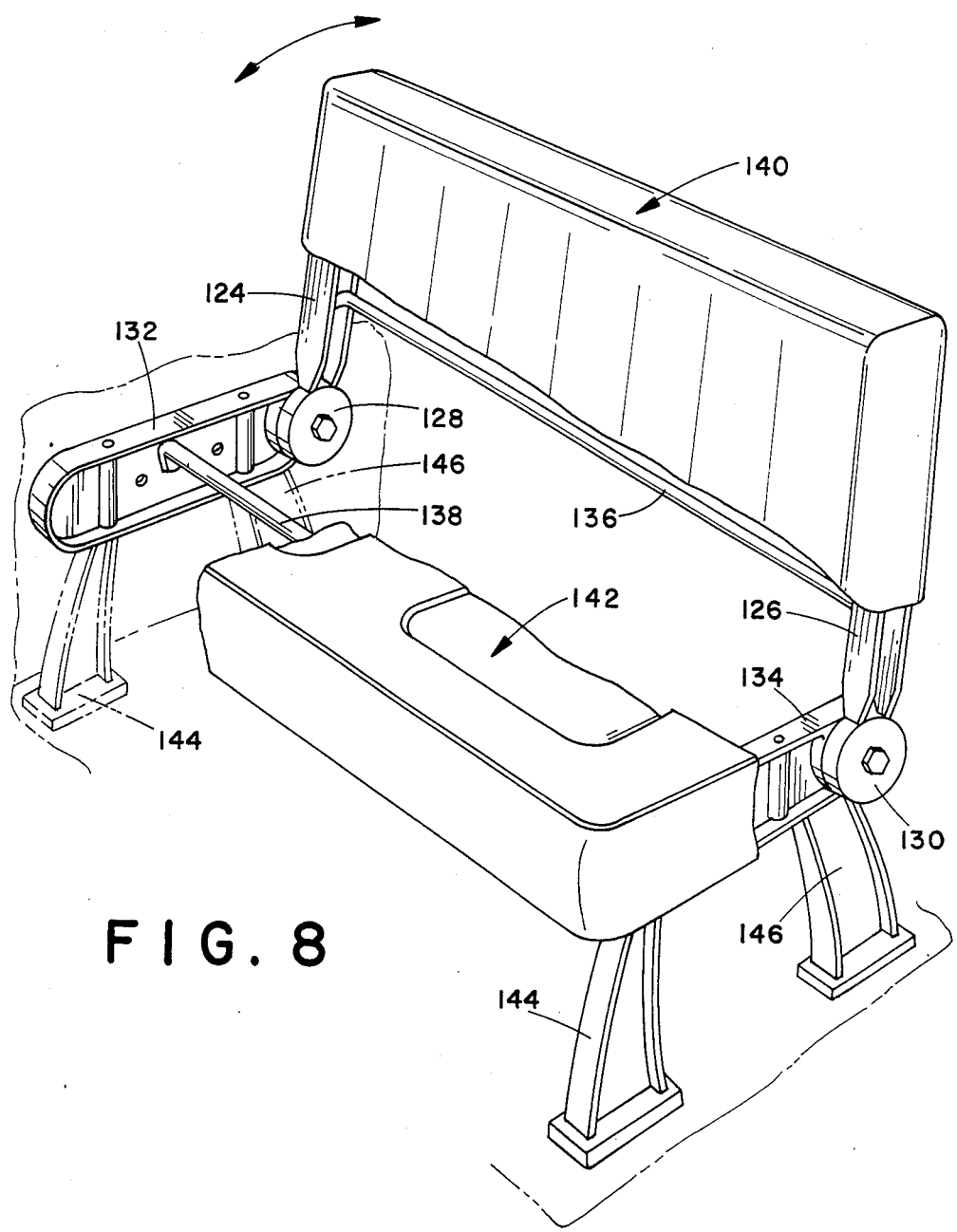
FIG. 8 is a perspective view of a school bus seat frame which incorporates the subject new energy absorber system therein and with the seat back and seat bottom partially cut away for ease of illustration; and, FIG. 9 is a plan view of still another alternative energy absorbing system constructed in accordance with the invention.

The incorporation of the subject new energy absorber system into a school bus seat frame is particularly illustrated in FIG. 8. There, the seat back frame is comprised of a pair of spaced apart, substantially parallel frame members 124, 126. These frame members extend from a pair of axially aligned, spaced apart energy absorbers 128, 130 which are constructed and operate substantially as described above. The seat bottom frame is comprised of a pair of substantially parallel, spaced apart members 132 and 134 which also extend radially from energy absorbers 128, 130 in angular spaced relation to seat back frames 124, 126, respectively. Energy absorbers 128, 130 thus form the joints between the seat back and seat bottom frames.

A pair of tubular members or rods 136, 138 extend across the void formed by the substantially parallel seat back and seat bottom frames. Frame members 124, 126 and 132, 134 may advantageously be made from a fiber reinforced plastic such as is available under the trademark AZDEL. The area between the seat back frames may then be filled with a sheet of fiber reinforced plastic to form the seat back generally designated 140. A foam polystyrene backing may be placed on the rear portion of the seat back, while a thin layer of padding may be applied to the front. A plywood base or similar material extends across the area between the seat bottom frame members 132, 134 to form a seat bottom 142. Appropriate cushioning and covering may be affixed to the plywood base to complete the seat bottom construction. A pair of legs 144, 146 are shown as extending downwardly from seat bottom frame 134. Seat bottom frame 132 may alternatively be fixedly secured to the side of the bus interior, or have a similar pair of legs 144, 146 as is shown in phantom. In this manner, the overall seat construction is well secured to the bus interior.

The seat construction is very durable. Also, because the seat incorporates the subject new energy absorbing system which may be tailored to meet specific federal safety requirements, the bulky nature of previously used seat constructions may be replaced. In fact, because seats incorporating the concepts of the subject invention require less bulkiness in the seat back area, less distance is required between adjacent seat installations. Therefore, over the length of a conventional school bus chassis, an additional seat installation is made possible, thus increasing the bus capacity.

Although it is contemplated that in various environments the torsion member may be either elastically or plastically deformed, the particular application in a school bus environment requires that the torsion member plastically deform. In the preferred construction shown in FIG. 8, the seat back 140 has the capability of rotating either fore or aft as a result of a force that would be exerted by passengers during, for example, either a rear end or front end collision. Federal safety standards require that no kickback of the seat back occur since it could result in further injury to passengers. In using the concepts of the subject invention, the force exerted on seat back 140 causes rotation of the first housing member relative to the second housing member in each of absorbers 128, 130, and plastically deforms the torsion member confined therein. Deformation of the torsion member, in turn, absorbs the energy in the impact force.

Figure 9:
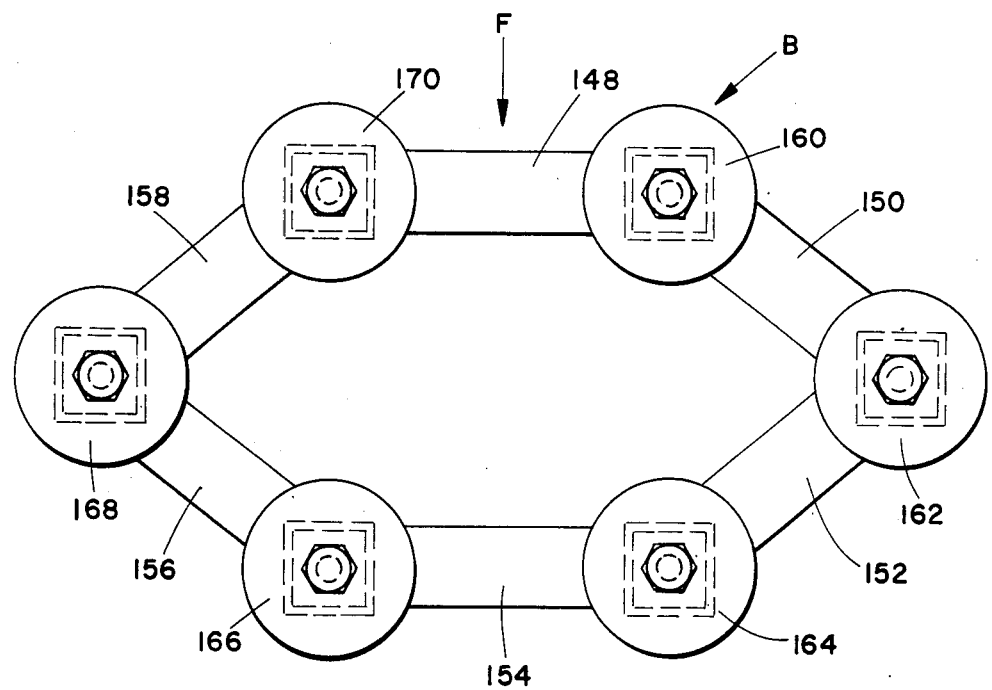

FIG. 9 illustrates an alternative energy absorbing system B in which a plurality of elongated members 148, 150, 152, 154, 156, 158 are connected in an end-to-end relationship by a plurality of the energy absorbing devices 160, 162, 164, 166, 168, 170 to form a polygonal form. The energy absorbing devices may be constructed as described with reference to any of the alternative embodiments of FIGS. 1-7. The opposite ends of each of the elongated members are connected to the energy absorbing devices to form moment arms such that the moment arms for each device are shared with the adjacent devices.

One example of the use of the absorption system B shown in FIG. 9 would be in an automobile bumper. It is contemplated that the polygonal frame will be attached to the automobile along, for example, elongated member 154 while the bumper would be attached along elongated member 148. Application of an impact force F will force the bumper and elongated member 148 toward the automobile and elongated member 154. The remaining elongated members 150, 152, 156, 158 will attempt to rotate about their associated energy absorbers to absorb the energy imparted by the force F. While an elastic and/or plastic deformation may occur in at least some of the torsion members which are housed in the energy absorbers as a result of the impact force, damage to the vehicle is reduced, and repair work to the system is relatively easy because of the simple construction of the energy absorbing devices. Removal of the bumper and separation of the elongated members allows easy removal and insertion of new torsion members. By partially filling the housing cavities as described above, or through the use of various shapes, sizes or materials, the amount of energy which can be absorbed is adjustable to accommodate a great range of forces.

In a similar fashion, the FIG. 9 embodiment is applicable to other uses such as a torsional spring for decelerating a rail car, or the like. In such an application, the polygonal energy absorber frame is attached to a stationary bulkhead along elongated member 154, while elongated member 148 faces outwardly from the bulkhead. The rail car engages the torsional spring along the member 148. The remaining elongated members 150, 152, 156, 158 will attempt to rotate about their respective energy absorbers which, in turn, deform and absorb the energy of impact.

The invention has been described with reference to preferred and alternative embodiments. Obviously, modifications and alterations will occur to others upon a reading and understanding of this specification. It is to be appreciated, for example, that the energy absorbing device or system concept described above may be adapted to use in any number of environments and applications in which it would be desired and/or required to provide cushoning or impact absorption. It is intended to include all such modifications and alterations insofar as they come within the scope of the appended claims or the equivalents thereof.

Having thus described the invention, it is now claimed:

1. An energy absorber comprising:
   a first housing having a first cavity and having a first arm extending generally radially therefrom;
   a second housing disposed adjacent said first housing having a second cavity and having a second arm extending generally radially therefrom;
   one of said first and second housings having a pair of spaced apart yoke portions including aligned, facing yoke cavities, the other of said housings being received intermediate said yoke portions;
   a non-elastic deformable torsion member having axial portions thereof received in said first and second cavities;
   means for preventing relative rotation between said torsion member and said first and second housings; and,
   said torsion member being hollow and at least one of said first and second cavities including a partial filling portion closely received in the interior of said torsion member.

2. The energy absorber as defined in claim 1 wherein said torsion member is hollow and one of said cavities includes a filling portion received in the interior of said torsion member.

3. The energy absorber as defined in claim 1 further comprising rotational guide means for maintaining said housing in aligned, rotative relationship during imposition of torsional forces thereto.

4. An energy absorber comprising:

a first housing;

a second housing operatively disposed in adjacent, facing relation to said first housing;

a deformable torsion member substantially completely received in said first and second housings and interconnecting said housings axially of each other;

first means for retaining said torsion member in substantially fixed relation with said first housing;

second means for retaining said torsion member in substantially fixed relation with said second housing;

third means for retaining said first and second housings in fixed axial position relative to one another whereby relative rotation between said first and second housings requires torsional deformation of said torsion member; and, rotational guide means for maintaining said housings in aligned, rotative relationship during imposition of torsional forces thereto.

5. The energy absorber as defined in claim 4 wherein said first housing includes a pair of spaced apart yoke portions including aligned, facing yoke cavities adapted to receive said second housing intermediate said yoke portions.

6. The energy absorber as defined in claim 4 wherein said first housing is constructed of a material having a torque resisting capability greater than said torsion member.

7. The energy absorber as defined in claim 4 wherein said housings are constructed of a material having a torque resisting capability greater than said torsion member whereby said torsion member deforms in a controlled manner such that energy is absorbed and dissipated during relative rotation between said housings.

8. The energy absorber as defined in claim 4 wherein said first retaining means includes a cavity having a non-circular conformation adapted to prevent relative rotation between said torsion member and said first housing.

9. The energy absorber as defined in claim 8 wherein said second retaining means includes a cavity having a non-circular conformation adapted to prevent relative rotation between said torsion member and said second housing.

10. The energy absorber as defined in claim 4 wherein said torsion member has a hollow configuration and said third retaining means includes a fastening member operatively fixed to said first and second housings and freely received through said torsion member.

11. The energy absorber as defined in claim 4 wherein said rotational guide means includes a groove formed in at least one of said housings.

12. The energy absorber as defined in claim 11 wherein said rotational guide means includes a rim extending from the other of said housings for operative engagement with said groove.

13. The energy absorber as defined in claim 11 wherein said rotational guide means includes a second groove formed in the other of said housings, said grooves adapted to operatively receive a guide rim therebetween.

14. The energy absorber as defined in claim 4 wherein said first and second housings include facing cavities adapted to closely receive said torsion member.

15. The energy absorber as defined in claim 14 wherein said torsion member is hollow and at least one of said cavities includes a partial filling closely received in the interior of said torsion member.

16. An energy absorber comprising:

a first housing having a first cavity;

a second housing in axial abutting relation to said first housing, said second housing having a second cavity in facing, mating relation with said first cavity;

means for retaining said first housing in substantially fixed axial relation relative to said second housing; and, a torsion member having an axial length completely received in said housings, said torsion member including first and second opposed ends, said first end operatively received in said first cavity for substantially non-rotative relation therewith, said second end operatively received in said second cavity for substantially non-rotative relation therewith, rotation of said first housing relative to said second housing being opposed by said torsion member, and said torsion member ends remaining substantially fixed relative to said respective housings as said torsion member undergoes one of elastic and plastic deformation.

17. The energy absorber as defined in claim 16 wherein said first and second housings include cooperating rotational guide means.

18. The energy absorber as defined in claim 17 wherein said rotational guide means includes a groove formed in one of said first and second housings.

19. The energy absorber as defined in claim 18 wherein said rotational guide means further includes a rim extending from the other of said housings for operative engagement with said groove.

20. The energy absorber as defined in claim 18 wherein said rotational guide means includes a second groove formed in the other of said housings, said grooves adapted to operatively receive a guide rim therebetween.

21. The energy absorber as defined in claim 16 wherein said first and second housings include facing, concentric cavities adapted to receive said torsion member therein.

22. The energy absorber as defined in claim 21 wherein said torsion member is hollow and has a predetermined peripheral configuration for mating, non-rotational receipt in said housing cavities.

23. The energy absorber as defined in claim 21 wherein said first housing cavity is generally annular.

24. The energy absorber as defined in claim 16 wherein said torsion member is hollow and at least one of said cavities includes a partial filling closely received in the interior of said torsion member.

* * * * *